United States Patent [19]
Proulx

[11] Patent Number: 5,647,264
[45] Date of Patent: Jul. 15, 1997

[54] INDEXABLE CUT-OFF SAW

[75] Inventor: Sylvester Eugene Proulx, Windsor, Canada

[73] Assignee: Advanced Cutting Tool Systems Inc., Windsor, Canada

[21] Appl. No.: 434,857

[22] Filed: May 4, 1995

Related U.S. Application Data

[63] Continuation of Ser. No. 254,768, Jun. 6, 1994, abandoned.

[51] Int. Cl.⁶ .......................... B23D 61/02; B27B 33/08
[52] U.S. Cl. .................. 83/840; 83/841; 83/853; 83/855
[58] Field of Search .................. 83/835, 839, 840, 83/841–844, 848, 849, 852, 853, 854, 855, 851, 955; 407/62

[56] References Cited

U.S. PATENT DOCUMENTS

| | | | |
|---|---|---|---|
| 2,600,272 | 6/1952 | Segal | 83/852 |
| 3,788,182 | 1/1974 | Tyler | 83/835 |
| 3,899,813 | 8/1975 | Lovendahl | 83/839 X |
| 4,135,421 | 1/1979 | Bertram et al. | 83/852 X |
| 4,164,329 | 8/1979 | Higby | 83/853 X |
| 4,222,298 | 9/1980 | James | 83/855 X |
| 4,738,291 | 4/1988 | Isley | 83/853 X |
| 4,848,205 | 7/1989 | Suzuki et al. | 83/839 X |
| 5,363,891 | 11/1994 | Plante | 83/853 X |

FOREIGN PATENT DOCUMENTS

| | | | |
|---|---|---|---|
| 530384 | 9/1956 | Canada | 83/835 |
| 770413 | 10/1967 | Canada | 83/835 |

*Primary Examiner*—Eugenia Jones

[57] ABSTRACT

An indexable cut-off saw is used for cutting metal components, e.g. cutting a bearing cap cluster into separate caps. The saw has a circular tool body for mounting on an arbour and this tool body has flat side faces and a narrow outer periphery. A plurality of circumferentially equally spaced cutting inserts are mounted at the outer periphery of the tool body, these inserts being arranged in groups of three such that the total width of the saw cut is divided between the actions of three cooperating cutting inserts. These three cooperating cutting inserts include a central insert mounted centrally on the outer periphery of the tool body and left and right side inserts mounted in pockets extending into the side faces of the tool body. The left and right side inserts are of rectangular configuration presenting straight cutting edges, while the central cutting insert of each group presents a curving cutting face. The central cutting insert is preferably in the form of a cylindrical cutter disc with flat end faces providing a cutting edge disposed about the periphery of an end face. These cylindrical cutter discs are mounted on an end face thereof at an angle within about 1°–15° of coincidence with the direction of travel of the insert during cutting. It is also possible to use as the central cutting insert a circular cutting disc mounted axially into a pocket in the periphery of the tool body.

7 Claims, 2 Drawing Sheets

INDEXABLE CUT-OFF SAW

This application is a continuation of application No. 08/254,768, filed Jun. 6, 1994, now abandoned.

BACKGROUND OF THE INVENTION

This invention relates to an indexable cut-off saw of the type used by the automotive industry for cutting metal components e.g. cutting a bearing cap cluster into separate caps.

In the automotive industry, it is commonplace to cast components such as bearing caps in clusters, e.g. using a nodular high strength cast iron, and to thereafter cut these clusters into separate caps. This is typically done by mounting several, e.g. four or five, saws on an arbour for cutting several caps from a cluster simultaneously.

Each saw is typically in the form of a circular tool body for mounting on an arbour, this tool body having flat side faces and a narrow outer periphery. Equally spaced cutting inserts are mounted at the periphery alternately on each side face of the tool body. The inserts are actually mounted into pockets extending into each side face of the tool body and are rectangular in configuration, presenting a straight cutting edge. The insert holding pockets extend into the side faces of the tool body such that there is overlap between the cutting paths of each adjacent pair of cutting inserts. In other words, each alternate insert removes over one half the total width of the saw cut.

It is an object of the present invention to provide a cut-off saw with improved chip evacuation. A further object is to provide increased tool life. Yet another object is to provide better surface finishes. Still another object is to provide reduced noise level during cutting and yet another object is to provide lower horsepower requirements per cutting insert.

SUMMARY OF THE INVENTION

One embodiment of the present invention relates to a circular cut-off saw for cutting metal comprising a circular tool body for mounting on an arbour, this tool body having flat side faces and a narrow outer periphery. A plurality of circumferentially equally spaced cutting inserts are mounted at the outer periphery of the tool body. In accordance with the main feature of the present invention, these cutting inserts are arranged in groups of three such that the total width of the saw cut is divided between the actions of three cooperating cutting inserts. These three cooperating cutting inserts include a central insert mounted centrally on the outer periphery of the tool body and left and right side inserts mounted in pockets extending into the side faces of the tool body. The left and right side inserts are of rectangular configuration presenting straight cutting edges, while the central cutting insert of each group presents a curving cutting face.

The central cutting insert presenting the curved cutting face may in one embodiment be in the form of a cylindrical cutter disc with a pair of axially opposed flat circular side faces joined by an outer peripheral wall, with an arcuate cutting edge being provided between each circular side face and the outer peripheral wall. Each cylindrical cutter disc is mounted on a side face thereof centrally on the outer periphery of the tool body with the axis of each disc being within about 1°–15° of coincidence with a corresponding radius of the tool body. Alternatively, the central cutting insert of each group may be in the form of a circular cutting disc mounted axially within a pocket extending into the outer periphery of the tool body.

The cylindrical cutter discs mounted on their flat side faces are particularly advantageous. By setting these discs at a small angle with respect to the direction of travel of the discs during cutting, the cutting edges of the discs form small arcs of much larger circles. This causes a peeling action which decreases the load on individual inserts, while at the same time placing decreased demands on the side cutting inserts with the straight cutting edges.

With the arrangement of the present invention, the round insert removes the center of the saw cut and stabilizes the saw while the side cutters share the remaining stock removal. This allows for better chip evacuation with smaller chips being formed, increased tool life, better surface finishes, reduced noise level during cut and lower horsepower requirements per insert. The saw has been found to be particularly effective for cutting nodular high strength cast iron, such as that used in the casting of bearing cap clusters for the automotive industry.

BRIEF DESCRIPTION OF THE DRAWINGS

FIG. 7 is an enlarged view of a portion of FIG. 4;

FIG. 8 is an enlarged view of a portion of FIG. 5;

FIG. 9 is an enlarged view of a portion of FIG. 4; and

FIG. 10 is an enlarged view of a portion of FIG. 5.

Figures 1, 2:
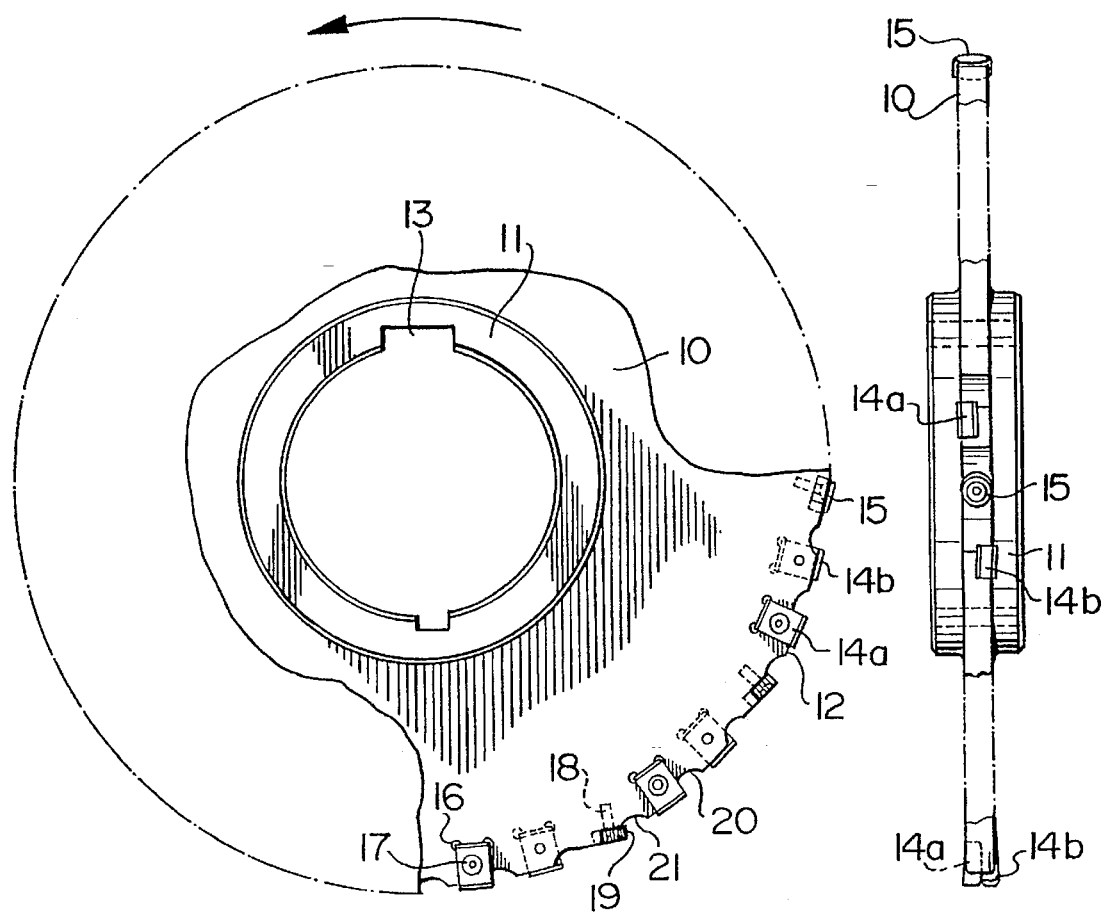
FIG. 1 is a side elevation of a cut-off saw according to the invention.
FIG. 2 is an end elevation of the cut-off saw of FIG. 1.

Looking first at the embodiment of FIGS. 1, 2, 3, 7 and 8, one sees a circular tool body portion 10 with a central hub portion 11 for mounting on an arbour, including an outer periphery 12 and a key way 13 for mounting on a shaft.

Rectangular cutting inserts 14a and 14b are mounted in pockets 16 extending into the side faces of tool body 10. These side inserts 14a and 14b are of known type and are typically made of tungsten carbide cutting tool material. Each cutting insert is held in place in pocket 16 by means of screw 17. These inserts 14a and 14b are indexable to present new cutting edges.

Cylindrical cutter discs 15 are also of known type and are mounted on the outer periphery of tool body 10, one of these being used in combination with each pair of side cutters. It will be seen that these cylindrical cutter discs 15 lie on their flat side faces providing a cutting edge disposed about the periphery of a side face. It can be seen particularly from FIG. 7 that the cylindrical cutter discs 15 are set at a small negative cutting angle of about 1°–15° of coincidence with a corresponding radius of the tool body. It will be seen that each cylindrical cutter rests within a retaining pocket 19 and is held in place by a screw 18. The outer periphery 12 of tool body 10 also includes chip relief gaps 20 and 21 between the inserts.

Figure 3:
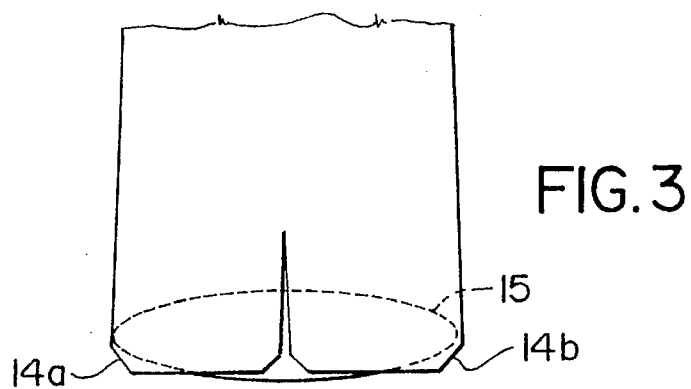
FIG. 3 is a schematic representation of the cutting action of the cutting inserts.
Figures 4, 5:
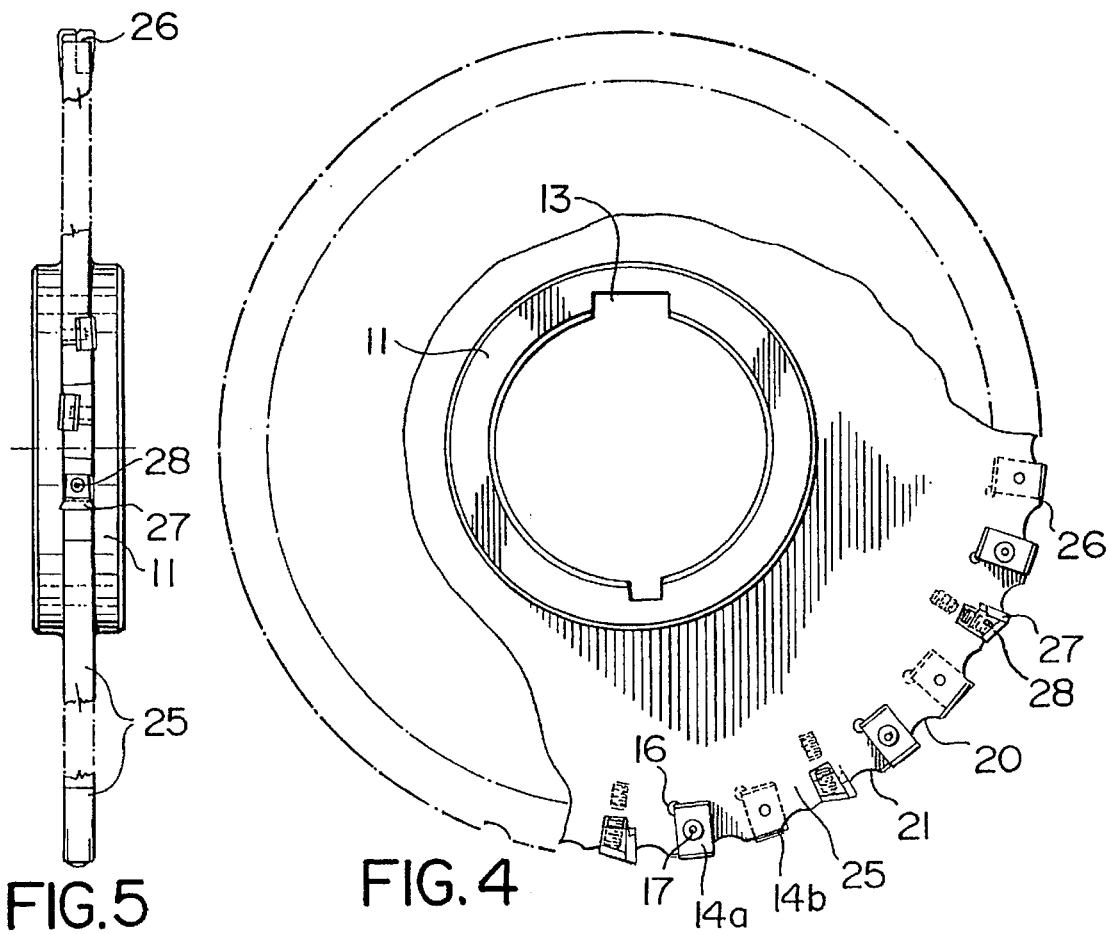
FIG. 4 is a side elevation of an alternative design of cut-off saw according to the invention.
FIG. 5 is an end elevation of the cut-off saw of FIG. 4.
Figure 6:
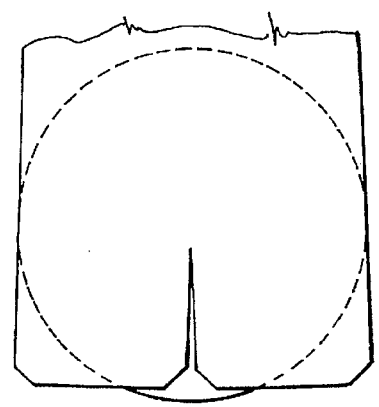
FIG. 6 is a schematic representation of the cutting action of the cutting inserts of FIGS. 4 and 5.

The cutting profile that is developed with the above combination of inserts can be seen in FIG. 3. Thus, it will be seen that the side cutting inserts 14a and 14b remove the outer portions while the central portion is removed by the cylindrical cutter 15. Because of the shallow angle of the cylindrical cutter, it will be seen that it projects into the cut only about 0.01 inch further than the side cutters.

A typical saw of the above type may have a diameter of 12 inches and have 16 cylindrical disc inserts along with 32 rectangular inserts. It can be operated at 95 r.p.m. or 300 SFM, with a feed per revolution of 0.091 inch and a feed per minute of 8.606 inches.

A second embodiment of the invention is shown in FIGS. 4, 5, 6, 9 and 10. In this embodiment, the tool body 25 and peripheral edge 26 are modified to permit the use of a different form of round central cutter 27. Thus, in this embodiment the round inserts 27 stand in an upright position substantially axially. They are held in place within a pocket 30 by means of a wedge 28 and a screw 29. Because of the upright configuration of the insert 27, it will be seen from FIG. 6 that the central insert in this embodiment removes a deeper and narrower portion of the cut than in the embodiment of FIG. 3.

I claim:

1. A circular cut-off saw for cutting metal comprising a circular tool body for mounting on an arbour, said tool body having flat axially opposed side faces and a narrow outer periphery, and a plurality of circumferentially equally spaced cutting inserts mounted at the outer periphery of the tool body, said cutting inserts being arranged in cooperating groups of three such that the total width of the saw cut is divided between the actions of the three cooperating cutting inserts, each group of three cooperating cutting inserts comprising a central insert mounted centrally on the outer periphery of the tool body and left and right side inserts, each side insert presenting a straight cutting edge mounted in pockets extending into said axially opposed side faces of the tool body, each said central insert comprising a cylindrical cutter disc having a pair of axially opposed flat circular side faces joined by an outer peripheral wall, and an arcuate cutting edge being provided between a said circular side face thereof and the outer peripheral wall, each said cylindrical cutter disc being mounted on the outer periphery of the tool body while resting on a said circular side face thereof with the central axis of the cutter disc being within about 1°–15° of coincidence with a corresponding radius of the tool body, said central cylindrical insert of each group being adapted to remove a central portion of a total saw cut and said left and right inserts with straight cutting edges being adapted to remove the balance of the total saw cut.

2. A saw according to claim 1 wherein each said cylindrical cutter disc is mounted in a pocket in said outer periphery, each pocket having a flat bottom face and a rear abutment to engage said disc.

3. A saw according to claim 2 wherein the cylindrical cutter discs are mounted by means of screws.

4. A saw according to claim 2 wherein the side inserts are rectangular inserts.

5. A saw according to claim 4 wherein the side inserts are mounted by means of screws.

6. A saw according to claim 4 wherein a chip relief gap is provided preceding each cutting insert.

7. A saw according to claim 4 wherein each combination of two side straight cutting inserts and one central cylindrical cutting insert is arranged such that each cutting insert in the combination cuts approximately one third of the total cut.

* * * * *